(12) United States Patent
Yau et al.

(10) Patent No.: US 7,792,542 B2
(45) Date of Patent: Sep. 7, 2010

(54) TRANSMIT CHANNEL POLICING SYSTEM, DEVICE, AND METHOD

(75) Inventors: Janus Sing Yau, Ottawa (CA); Padakandla Krishna Rao, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 239 days.

(21) Appl. No.: 10/892,202

(22) Filed: Jul. 16, 2004

(65) Prior Publication Data

US 2006/0014498 A1   Jan. 19, 2006

(51) Int. Cl.
  *H04B 7/00*   (2006.01)
(52) U.S. Cl. .............. 455/519; 455/90.2; 455/515; 455/518; 455/458; 455/521; 455/509; 455/528; 370/338; 370/466; 370/401; 370/444; 370/462; 370/252; 370/278
(58) Field of Classification Search ............... 455/90.2, 455/515, 518, 519, 458, 521
See application file for complete search history.

(56) References Cited

U.S. PATENT DOCUMENTS

| | | | |
|---|---|---|---|
| 5,912,882 A | 6/1999 | Yafuso et al. | |
| 5,960,362 A * | 9/1999 | Grob et al. | 455/527 |
| 5,983,099 A * | 11/1999 | Yao et al. | 455/426.1 |
| 6,295,284 B1 * | 9/2001 | Maggenti | 370/328 |
| 6,301,263 B1 * | 10/2001 | Maggenti | 370/462 |
| 6,445,915 B1 * | 9/2002 | Baiyor et al. | 455/416 |
| 6,477,150 B1 * | 11/2002 | Maggenti et al. | 370/312 |
| 6,751,468 B1 * | 6/2004 | Heubel et al. | 455/518 |
| 6,952,592 B2 * | 10/2005 | Dorenbosch | 455/518 |
| 7,242,953 B2 * | 7/2007 | Al-Housami et al. | 455/522 |
| 7,319,879 B2 * | 1/2008 | Harris et al. | 455/458 |
| 2002/0150091 A1 * | 10/2002 | Lopponen et al. | 370/389 |
| 2004/0032843 A1 * | 2/2004 | Schaefer et al. | 370/338 |
| 2004/0072586 A1 | 4/2004 | Dorenbosch | |
| 2004/0127233 A1 | 7/2004 | Harris et al. | |
| 2005/0190723 A1 * | 9/2005 | Rao et al. | 370/329 |

FOREIGN PATENT DOCUMENTS

| | | |
|---|---|---|
| CA | 2495001 A1 | 2/2004 |
| JP | 2001-224073 | 8/2001 |
| JP | 2003-309473 | 10/2003 |
| WO | WO 97/48248 A2 | 12/1997 |
| WO | WO 2004/036787 A | 4/2004 |

OTHER PUBLICATIONS

Comneon, Ericsson, Motorola, Nokia, Siemens; Push-to-Talk over Cellular (PoC) User Plane, Transport Protocols, PoC Release 2.0; Jun. 2004, p. 34-38.*

Push to Talk over Cellular, Technical Specification, (Commeon et al) Jun.-2004 "Transport Protocols" V2.0.6 sections 5 and 7 http://www.motorola.com/content/0,,2647-4398,00.html.

(Continued)

*Primary Examiner*—Matthew D Anderson
*Assistant Examiner*—April G Gonzales

(57) ABSTRACT

Systems and methods are provided for controlling transmit channel utilization in systems providing walkie-talkie-like communications to wireless devices. Parameters such as a maximum talk time and back off time are provided to each wireless device to control how long they can continuously occupy the talk channel, and to control how soon after releasing the talk channel they can again access the talk channel.

13 Claims, 5 Drawing Sheets

OTHER PUBLICATIONS

English-language translation of Office Action issued on Jul. 10, 2009 for application No. 200580023970.2.
OMA PoC User Plane (Draft Version 1.0.3 May 2004) Open Mobile Alliance OMA-UP-POC-V0-1-20040528-D.
English-language translation of Office Action issued on Jun. 17, 2009 for corresponding Japanese Patent Application No. 2007/520629.
English-language translation of Abstract for JP 2001-224073.
English-language translation of Abstract for JP 2003-309473.
English-language translation of Paragraphs 16 to 29 for JP 2001-224073.
English-language translation of Paragraphs 2 to 14 for JP 2003-309473.

* cited by examiner

TRANSMIT CHANNEL POLICING SYSTEM, DEVICE, AND METHOD

FIELD OF THE INVENTION

The invention relates to wireless communications systems and more particularly to policing of transmit channel possession in wireless communications systems providing half-duplex voice communications services.

BACKGROUND OF THE INVENTION

Communication systems are available which provide walkie-talkie-like functionality or similar half-duplex voice functionality which may take the form of PTT™ (push-to-talk™) over a dispatch service, PTT™ over cellular (PoC) services (part of the OMA standard), or otherwise. When referred to herein, walkie-talkie-like functionality and half-duplex voice functionality are to be taken generally to mean any voice communication functionality delivered via a network or networks which at any one time is capable of transmitting voice communication from a talking or transmitting party's device to a listening or receiving party's device, but does not simultaneously transmit voice communication from the receiving party's device to the talking party's device, while the talking party's device is transmitting voice to the receiving party's device. During an active PTT™ session or dispatch call session, only one user device (the "talker's" device) participating in the session may be designated as the transmitting or talking device at any one time. The communication can be one to one or one to many. A user device gains the role of transmitting device by requesting the talk/transmit channel from the network and by being granted the talk/transmit channel by the network. While a talker's device is in possession of the transmit channel (during a talk period), all of the other devices (listeners' devices) in the active dispatch call session are in listener mode and cannot transmit voice until the transmitting device requests the network to terminate the talk period and release the talk/transmit channel. Times during which the talk/transmit channel is not occupied are idle periods. In standard implementations of PTT™, the user interface of, for example, a wireless device, includes a "talk" button to allow the user to control the sending of requests to acquire and release the talk/transmit channel, these requests being sent over a logical control channel to the network.

An example of a system providing PTT™ functionality as part of its dispatch services is the iDEN™ system of Motorola™. Other example systems which can provide such PTT™ services are 1xRTT CDMA, UMTS, GSM/GPRS, and TDMA. Push-to-talk™ service may be provided as an optional half-duplex service over existing network systems which also provide for full duplex communication, or may be provided as a service over network systems which provide only half-duplex communication.

SUMMARY OF THE INVENTION

According to one broad aspect, the invention provides a talk control element, for use with a network system adapted to deliver walkie-talkie-like communications capabilities between wireless devices, the network system allowing only one wireless device to occupy a talk channel at a given time, the talk control element being adapted to transmit at least one parameter to each wireless device which controls an amount of time each wireless device is allowed to continuously occupy a talk channel.

In some embodiments, a talk control element forms part of and in combination with the network system.

In some embodiments, the talk control element is external to the network system.

In some embodiments, the at least one parameter comprises a maximum talk time parameter for each wireless device representing a maximum amount of time the wireless device can continuously occupy the talk channel.

In some embodiments, the at least one parameter further comprises a back off time parameter to each wireless device representing a minimum time after releasing a talk channel before the wireless device can again request the talk channel.

In some embodiments, the at least one parameter comprises a back off time parameter for each wireless device representing a minimum time after releasing a talk channel before the wireless device can again request the talk channel.

In some embodiments, a network system is adapted to send the parameters upon registration of the wireless device.

In some embodiments, a network system is adapted to, for each wireless device, send the parameters upon registration of the wireless device only if a change to at least one of the parameters has occurred.

In some embodiments, a network system in combination with a plurality of said wireless devices, each wireless device comprising a talk processing element for processing the at least one parameter, and allowing requests for the talk channel to be generated in accordance with the at least one parameter.

In some embodiments, a network system in combination with a plurality of said wireless devices, each wireless device comprising a talk processing element for processing the at least one parameter, and allowing requests for the talk channel to be generated in accordance with the at least one parameter; wherein each wireless device automatically releases the talk channel after expiry of a period of time represented by the maximum talk time parameter for the wireless device.

In some embodiments, a network in combination with a plurality of said wireless devices, each wireless device comprising a talk processing element for processing the at least one parameter, and allowing requests for the talk channel to be generated in accordance with the at least one parameter; wherein each wireless device automatically releases the talk channel after expiry of a period of time represented by the maximum talk time parameter; following release of the talk channel by a wireless device, the wireless device does not allow a request for the talk channel to be generated for a period of time represented by the back off time parameter for the wireless device.

In some embodiments, a network system in combination with a plurality of said wireless devices, each wireless device comprising a talk processing element for processing the at least one parameter, and allowing requests for the talk channel to be generated in accordance with the at least one parameter; following release of the talk channel by a wireless device, the wireless device does not allow a request for the talk channel to be generated for a period of time represented by the back off time parameter for the wireless device.

In some embodiments, the network is implemented using at least one of PoC, IDEN, 1xRTT CDMA, UMTS, GSM/GPRS and TDMA.

According to another broad aspect, the invention provides a wireless device adapted to participate in a network delivered walkie-talkie-like communications session, the wireless device comprising: a talk processing element adapted to control amounts of time the wireless device is allowed to continuously occupy a talk channel for the session.

In some embodiments, a wireless device is adapted to control amounts of time the wireless device is allowed to continuously occupy a talk channel for the session in accordance with at least one parameter received from the network.

In some embodiments, a wireless device is adapted to automatically release the talk channel after continuously occupying the talk channel for a specified period of time.

In some embodiments, a wireless device is adapted to prevent the generation of a request for the talk channel for a specified period of time following release of the talk channel by the wireless device.

According to another broad aspect, the invention provides a method comprising: providing each wireless device participating in a network-delivered walkie-talkie-like communications session with at least one parameter to control an amount of time each wireless device is allowed to continuously occupy a talk channel; each wireless device controlling access to the talk channel in accordance with the at least one parameter.

In some embodiments, the at least one parameter comprises a maximum talk time and a back-off time.

In some embodiments, the at least one parameter is transmitted to each wireless device upon registration of the device with the network.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In the particular examples that follow, the walkie-talkie-like capabilities are assumed to be PTT™ capabilities. More generally, embodiments of the invention can be employed with any system providing network delivered walkie-talkie-like capabilities and are not limited to PTT™ capabilities of the examples. A network capable of delivering this will be referred to as a "dispatch network", even though such a network may also deliver non-dispatch functionality.

Users on the receiving end of a push-to-talk™ session held on known systems have no way of communicating to any other user in a group while a user of a transmitting device is transmitting, since the talk/transmit channel is occupied by the transmitting device until released. As such, prior to the present invention, there was no mechanism to prevent a user from indefinitely keeping possession of the talk/transmit channel.

Embodiments of the present invention attempt to mitigate the potential for abuse and the resulting inconvenience due to a user's possessing the transmit/talk channel indefinitely, or repeatedly taking control of the transmit channel without allowing other users participating in the call a chance to speak. In accordance with the preferred embodiments discussed below, methods, systems, and novel user devices, may be used to automatically provide policing of PTT™ transmit channel possession duration and transmit channel requesting frequency.

In preferred embodiments different subscribers may have different rules governing the policing of their PTT™ transmissions based on, for example, the Service Level Agreement (SLA)/policy set for the subscriber.

Figure 1A:
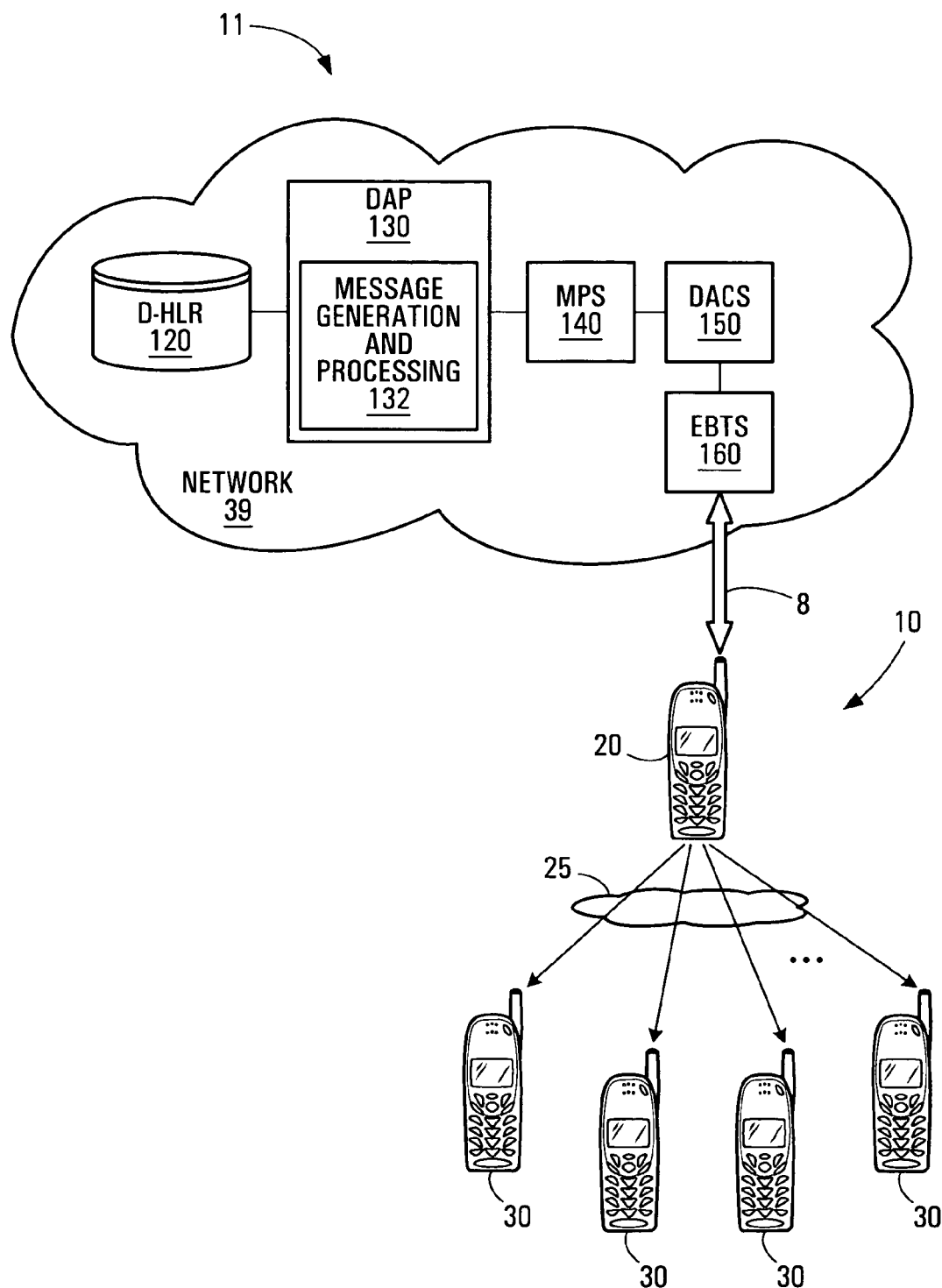
FIG. 1A is a block diagram illustrating an example active PTT™ session of a group according to an example embodiment of the invention in which talk control is performed by the network providing the PTT session.

Referring now to FIG. 1A, an example of a transmit channel policing method according to an embodiment of the invention will now be described in the context of an active dispatch call session for a PTT™ group of wireless mobile devices in a half-duplex dispatch system.

A communications system, generally indicated by reference numeral 11, which is a modified iDEN™ system, is shown having a PTT™ group (indicated generally by reference numeral 10) consisting of a group of mobile devices participating in an active PTT™ session while a transmit channel is possessed, along with the rest of a dispatch network 39.

The group 10 contains a single mobile device 20 in THD (transmitting in half-duplex) mode which is in talk/transmit mode and in possession of the transmit channel, and a set (only four shown) of devices 30 in RHD (receiving in half-duplex) mode which are in listening mode. It should be understood that transmit channel policing is equally applicable to embodiments in which the dispatch call session only involves two devices (a 1-to-1 session) or which involves more than two devices (a 1-to-many session). To simplify this description, a device in THD mode or RHD mode will be referred to as a THD device or an RHD device respectively. However it is to be understood these are temporary designations for the particular mode of operation of the device at any particular time. During the active session, the users of the RHD devices 30 are referred to as listeners, while the user of the THD device 20 is referred to as the talker. Each device of the specific embodiment shown in FIG. 1A is capable of functioning either as a THD device or an RHD device, depending upon which device is in talk/transmit mode and which devices are in listening mode during any particular active session. Upon receipt of a request from a wireless device for the talk channel, if the system grants the device the talk channel, then the device enters THD mode.

The establishment of the wireless links between devices of the users, the routing of voice data packets, and the duplication of voice data packets to each of the devices in listening mode are specific to each implementation of a PTT™ or similar half-duplex voice communication system. These functions are represented abstractly by links 25 which represent all of the system components which are part of the network 39 which are necessary to communicate the voice data sent by the THD device 20 to all of the RHD devices 30 and in general support the functions of the active session. The details of these links are not relevant here.

During the active session, the THD device 20 possesses the talk/transmit channel. A user can release the channel, for example, by releasing the talk button causing the wireless device 20 to initiate a request for release of the channel or to terminate the call, or using any appropriate interface provided on the device.

Within the dispatch network 39 is a dispatch application processor (DAP) 130 which is the processing entity responsible for the overall coordination and control of dispatch services in the iDEN™ system. The DAP 130 is coupled to a dispatch home location register (D-HLR) 120 which is a repository of data for dispatch calling identification and services. In some implementations the D-HLR 120 is resident on the DAP 130. The DAP 130 is coupled to a metro packet switch (MPS) 140 which is in turn coupled to a digital access cross connect switch (DACS) 150. The DACS 150 in turn is coupled to an enhanced base transceiver station (EBTS) 160. The EBTS 160 communicates with user devices over communication channel 8 over the air (OTA). Channel 8 may be outbound and inbound half-duplex voice communication channels (not shown), a control channel, and/or other existing channels (not shown). Various embodiments discussed below may use the DCCH (dedicated control channel) as the communication channel 8 to send and receive messages associated with transmit channel policing. In the course of providing coordination and control of dispatch calls, the DAP 130 may retrieve information from the D-HLR 120 regarding the various services and/or identifications including information pertaining to the particular service level, or policy set which determines the manner in which any particular mobile device is to be policed with respect to the transmit channel policing. In the course of communicating with the user device 20, the DAP 130 sends messages via the MPS 140, the DACS 150, and the EBTS 160 in order to interact with the user device 20.

The DAP 130 also has message generating and processing 132 which is adapted to send information pertaining to transmit channel policing including a maximum talk time, and a back-off time as discussed below. In a preferred embodiment, the message generation and processing 132 is implemented as a change to software already implemented on the DAP 130, but it may be implemented as separate software, hardware, firmware or a combination of these types of functionality. FIG. 1A shows a very specific example of network functionality which provides transmit channel policing services. The arrangement of FIG. 1A is particularly suitable for iDEN™ applications. It is to be clearly understood that other network side implementations may be employed for delivering the transmit channel policing methods described herein. These other implementations may be specific to iDEN™ or to other dispatch service implementations. The dispatch service may, of course, include additional system components not shown in FIG. 1A.

According to a preferred embodiment, during an active session the listener's devices 30 are no longer at the mercy of the THD device 20 in that the transmit/talk channel is no longer entirely under the control of the user of the THD device 20. As will be described below, parameters related to transmit channel policing which are updated or reassigned within the network may be communicated to the THD device 20 upon the device registering with the network, and/or at other times.

Figure 1B:
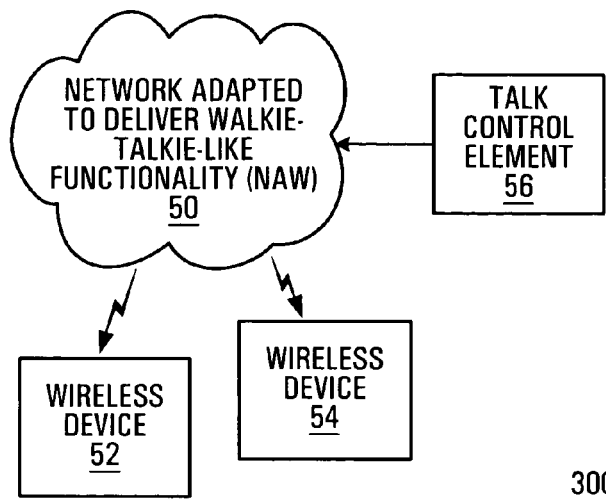
FIG. 1B is a block diagram illustrating an active PTT™ session of a group according to an example embodiment of the invention in which talk control is performed external to the network providing the PTT session.

Another embodiment of the invention is illustrated in FIG. 1B. In this embodiment, a NAW (network adapted to deliver walkie-talkie like functionality) 50 and a plurality of wireless devices 52,54 (only two shown in the illustrated example). A talk control element 56 has the parameters that are used to control talk channel usage. The talk control element 56 sends these parameters to the wireless devices. In some embodiments, the talk control element 56 is part of the NAW 50. In another embodiment, the talk control element 56 is external to the NAW 50. In the event the talk control element 56 is external to the NAW 50, it might be connected to the dispatch network through a data gateway. For example, a given corporate client may implement the talk channel policing independent of the dispatch network by providing their own talk control element 56. In such an embodiment, the parameters are sent from the talk control element 56 independent of other messages used to implement the walkie-talkie-like functionality, for example by sending packet data. The talk control element may be implemented in hardware, software, firmware to name a few examples or any combination of such elements, and may be centrally located or distributed.

For the embodiment of FIG. 1A, the talk control element 56 is implemented as part of the network, and uses the D-HLR to store the parameters.

Figure 2:
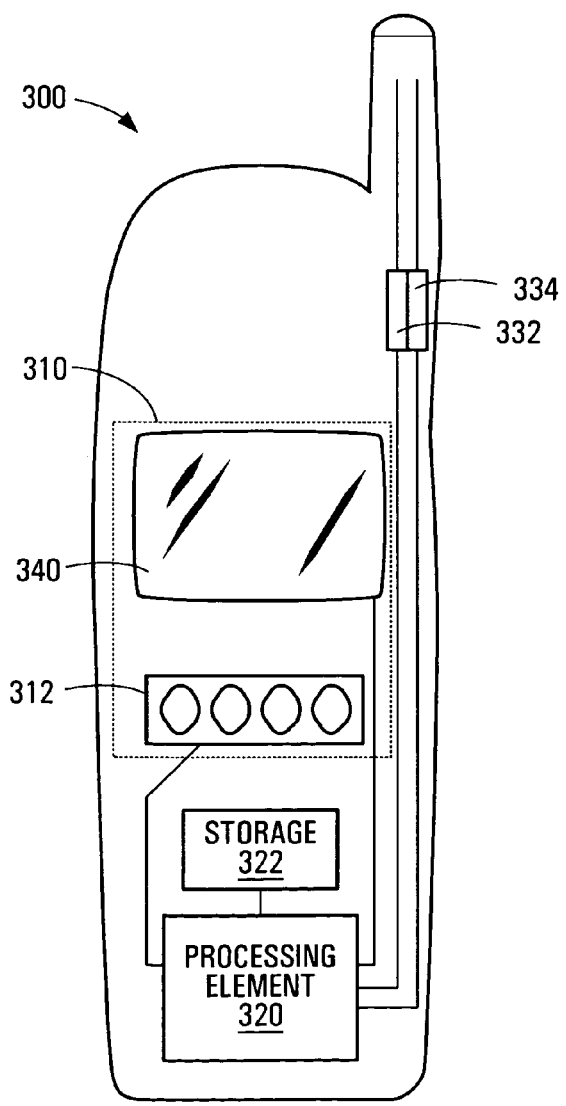
FIG. 2 is a schematic diagram of an example implementation of a wireless device provided by an embodiment of the invention.

Referring to FIG. 2, an example implementation of a PTT™ capable wireless device 300 provided by an embodiment of the invention will now be described. It is to be clearly understood that this is but one example of a wireless device which can be employed in embodiments of the invention allowing transmit channel policing.

It is also to be clearly understood that many other features will typically be included in an actual wireless device. These features are not shown in the interest of clarity. In the embodiment depicted in FIG. 2, the wireless device 300 has a talk request interface in the form of a keypad 312, and has a touchscreen 340. Other embodiments could include any other suitable input/output element(s). The talk request interface is coupled to a processing element 320. The processing element 320 is coupled to message transmission element 332. The message transmission element 332 may share resources with a message reception element 334. The message reception element 334 is coupled to the processing element 320. Elements 332,334 preferably form part of standard reception and transmission capabilities on the wireless device.

The processing element 320 represents any suitable processing capabilities implemented within the wireless device to handle the operation of the algorithms for policing the transmit channel. This element may be implemented as one or a combination of hardware, software, firmware. In a preferred embodiment, the processing element 320 is included as an addition to software capabilities already provided on an existing wireless device.

In operation, the wireless device 300 depicted in FIG. 2 is able to operate in a network providing walkie-talkie-like half duplex communications capabilities in THD mode and RHD mode. The device 300 is capable of initiating a group session and requesting the transmit channel from the network, upon initiation by the user. In the embodiment of FIG. 2, this initiation is effected by the pressing and holding down of a talk button within the keypad 312. The device does not enter THD mode until the system grants the transmit channel.

Processing element 320 performs transmit channel policing functions by obtaining any necessary data from storage 322, and commencing a timer function from the time the device enters THD mode. The transmit channel policing is executed preferably in accordance with the method described below with reference to FIGS. 3 and 4, or similar methods. The policing functions serve to limit the time that the device will possess the transmit channel. These functions also serve to restrain the device from obtaining the transmit channel again until a certain amount of time has passed after the talk button is released by the user.

FIG. 2 shows a very specific implementation for a user device capable of implementing the transmit channel policing methods provided by embodiments of the invention. It is to be clearly understood that the particular arrangement of components of FIG. 2 is only one example. The user device 300 may of course include additional components not shown in FIG. 2. The same functionality may be delivered with a different breakdown of components.

Figure 3:
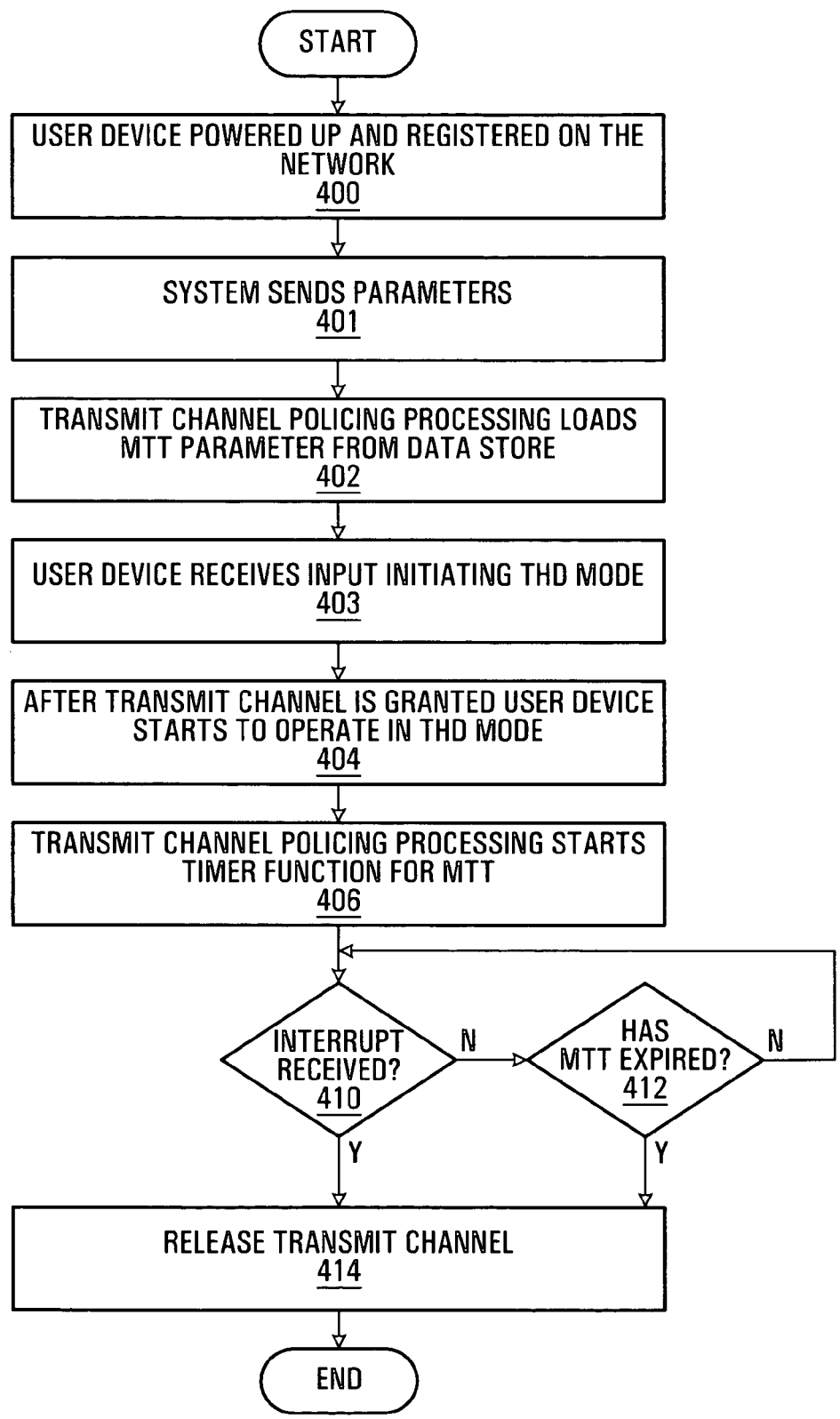
FIG. 3 is a flow diagram illustrating the steps performed in one embodiment of the invention for transmit channel policing.
Figure 4:
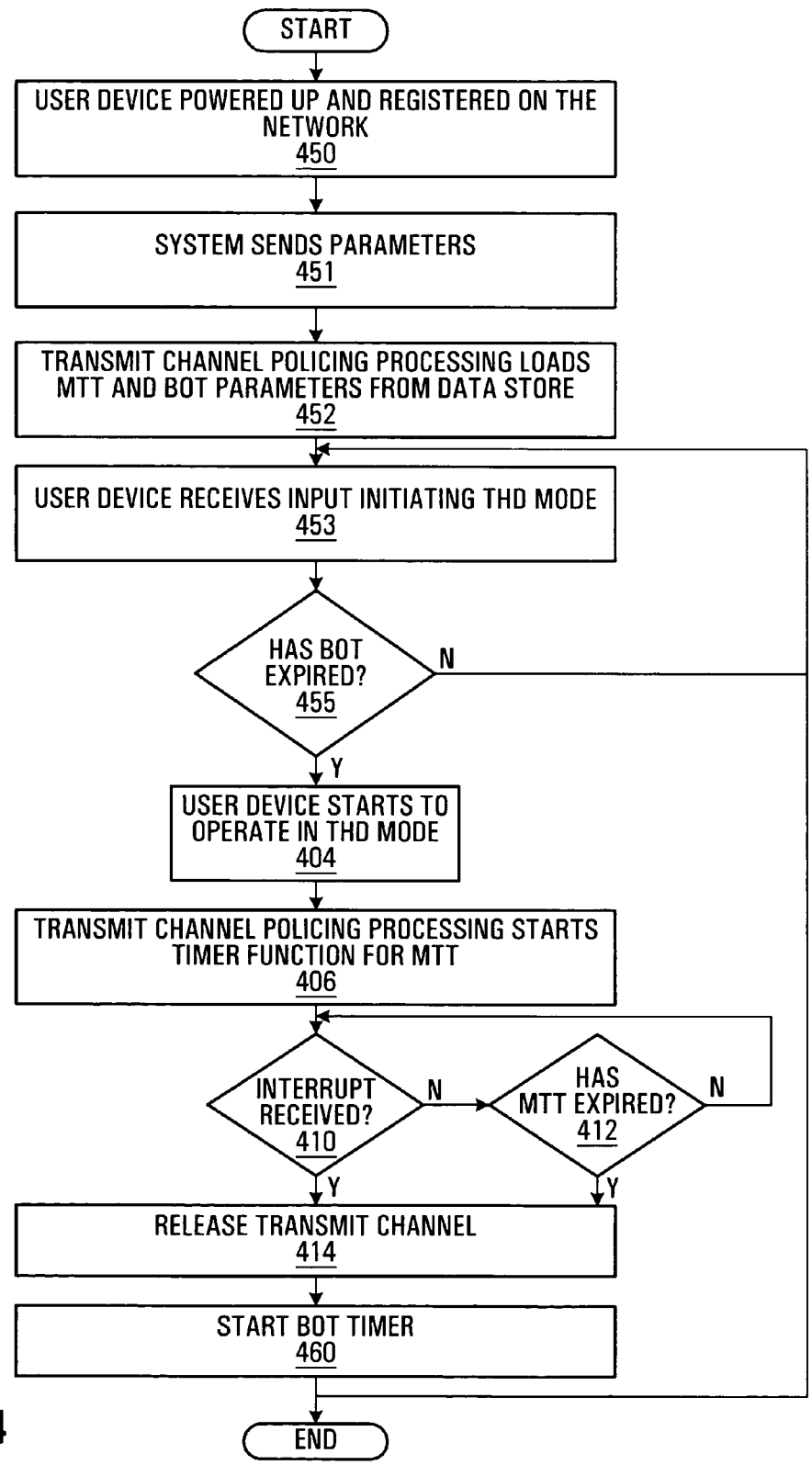
FIG. 4 is a flow diagram illustrating the steps performed in another embodiment of the invention for transmit channel policing.

Referring now to FIGS. 3 and 4, an example of transmit channel policing according to an embodiment of the invention will now be described in the context of an active dispatch call session for a group of wireless devices in a half-duplex group call.

Each wireless device may for example be as described with reference to FIG. 2 above, but is not limited thereto.

In the communications system, the THD device which is to be policed, first would have had to be powered up and registered on the network at step 400. In step 401, during or following registration, the system sends parameters to control transmit channel utilization. In the example that follows this is a maximum talk time (MTT) which is then stored in the data store. More generally, the device receives the parameter(s) and starts to operate in accordance with the parameter(s). In another embodiment, the parameters are not sent over the air, but rather are configured during manufacture or otherwise prior to deployment. Transmit channel policing processing is initialized at step 402 with the loading of a maximum talk time (MTT) parameter. Preferably, the MTT, or a parameter representing the MTT, is stored by the network, for example in D-HLR 120 for the network of FIG. 1A. This is downloaded upon power up or registration of the device. In another embodiment, all devices are configured with a default MTT which can then be used without requiring any change to the air interface. The transmit channel policing processing remains idle until the user device receives input initiating THD mode at step 403. After being granted the transmit channel, the user device thereafter begins to operate in THD mode at step 404. If the device is still in THD mode upon expiry of the MTT, the device will automatically release the channel. Any appropriate mechanism for timing the THD duration can be employed. A specific example has been included in FIG. 3. In this example, transmit channel policing processing starts a timer function at step 406 to keep track of the passage of an MTT duration. If an interrupt is received as indicated at step 410, for example as a result of the user releasing the talk button or the call ending, the transmit channel is released as indicated at step 414. Alternatively, if the MTT has expired (yes path 412), then the transmit channel is also released at step 414. Thus at the end of the method steps, the transmit channel will be available to other users. At the latest this will occur a duration of MTT after the user started transmitting.

In a preferred embodiment, a plurality of different levels of service or policy sets are defined, each with a respective MTT that may or may not be the same as that associated with other levels of service. The maximum talk time of a particular wireless device therefor is set based upon the level of service associated with the wireless device. Example values of MTT include but are not limited to seconds, minutes, and indefinite. A setting of indefinite could be policy based and assigned to important users or users responsible for critical operations who should be allowed to possess the transmit channel until they see fit to release it. Other possible times for MTT may be associated with for example Gold, Silver, and Bronze service level agreements. In the case where the MTT is set such that the device may possess the transmit channel indefinitely, steps 410 and 412 will be repeated until the user releases the talk button, at which point an interrupt will be assessed at step 412 and the transmit channel is released. Alternatively, no timing of the THD mode needs to take place in such a device.

Referring to FIG. 4, another example of transmit channel policing provided by another embodiment of the invention will now be described.

As with the steps performed in the embodiment depicted in FIG. 3, the THD device of FIG. 4 which is to be policed, first would have had to be powered up and registered on the network at step 450. The parameters are sent to the user devices at step 451. Transmit channel policing processing initializes at step 452 with the loading of a maximum talk time (MTT) parameter and a back off time (BOT). For the duration of the BOT, after a user releases a talk button, the user cannot request the transmit channel by again pressing the talk button. In this way a user is prevented from requiring the transmit channel before anyone else gets a chance to request the transmit channel.

A number of ways of preventing a particular user from accessing the channel following release may be implemented. A particular example is given below, but different methods may be used. The transmit channel policing processing remains idle until the user device receives input initiating THD mode at step 453. The transmit channel policing processing checks to see if the BOT timer has expired (either because it never started, or because a prior started BOT timer is running) at step 455. This would be the case if a user pressed the talk button within the duration of BOT, after previously releasing the channel. If the BOT timer has not expired, the process proceeds back to prior to step 453 when the device detected user input. In the case where the BOT timer is expired, the device is allowed to transmit the request for THD mode, and once the transmit channel is granted, the device will enter THD mode. Steps 404, 406, 410, 412, 414 of the method is the same as those described already with reference to FIG. 3. At step 460, following release of the transmission channel the BOT timer is started at step 460.

In a preferred embodiment, for each of the plurality of different levels of service or policy sets is a BOT which may or may not be the same as that associated with other levels of service. The back off time of a particular wireless device therefor is set based upon the level of service associated with the wireless device. Example values of BOT include but are not limited to seconds, minutes, and zero. A set value of zero could be policy based and assigned to important users or users responsible for critical operations, so that they can possess the transmit channel as soon as they wish after having released the talk button. The other possible times for BOT may be associated with for example Gold, Silver, and Bronze SLAs (service level agreements) in which less BOT is assigned to some levels than that which is assigned to others. In the case where the BOT to zero, steps 453 would always return a false as the BOT timer would never be started for that particular device under that SLA. Hence the device would simply proceed to step 454 and enter THD mode.

It should be understood that in the embodiments discussed above other processes may be running on the user device and other steps may be inserted into the methods described without changing the nature of the example embodiment.

In some embodiments, the method, system, and device are adapted to provide peripheral support for wired devices to participate in a wireless call via a network interworking function, so that although the devices are not within the wireless network, they appear as though they are, and are able to participate therein. Hence, according to this embodiment, not all of the devices in a PTT™ group are wireless, and transmit channel messaging occurs in an analogous manner to that described above in PTT™ groups where one or more of the devices is a stationary or otherwise non-wireless wired device. Hence, a wireless PTT™ session may have wired or landline based devices participating in the PTT™ session in accordance with the embodiments, adapted to police the transmit channel.

Some embodiments of the invention provide for the provisioning of the information such as the MTT and the BOT for storage in the wireless device. Two such examples are illustrated in FIGS. 5, and 6.

Figure 5:
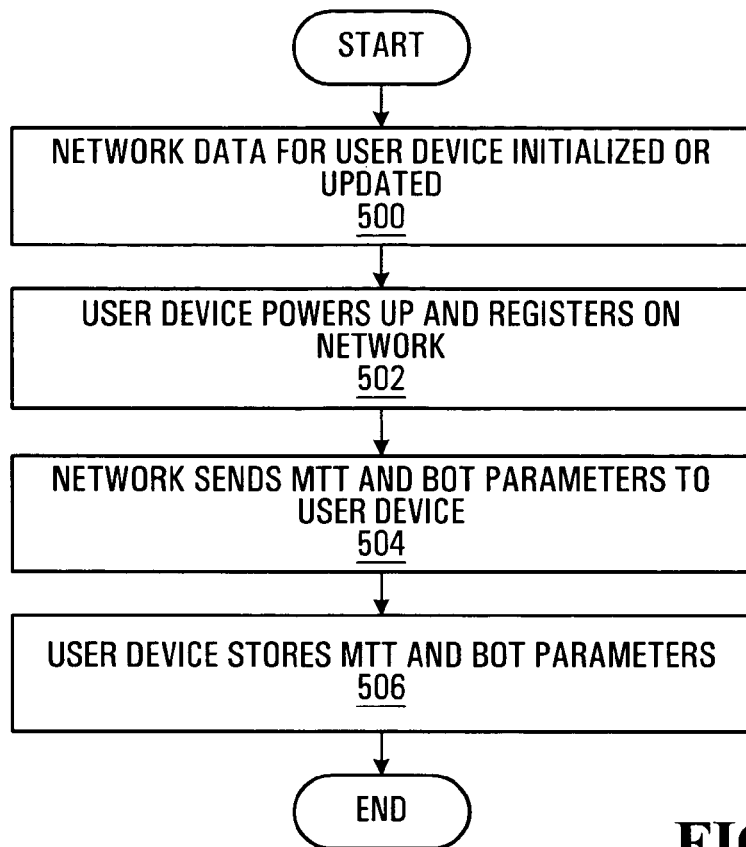
FIG. 5 is a flow diagram illustrating the steps performed in an embodiment of the invention for transmit channel policing parameter provisioning.

Referring to FIG. 5, a user device is provisioned with the MTT and BOT parameters whenever the network data for that user changes, or when the device is first initialized at step 500, upon power up of the user device. After the user's device powers up and registers at step 502, the network sends MTT and BOT parameters to the user device in step 504. The transfer of this information may occur within a registration accept message through a new control channel, an existing control channel, or through a traffic channel. In step 506 the user device stores MTT and BOT parameters.

Figure 6:
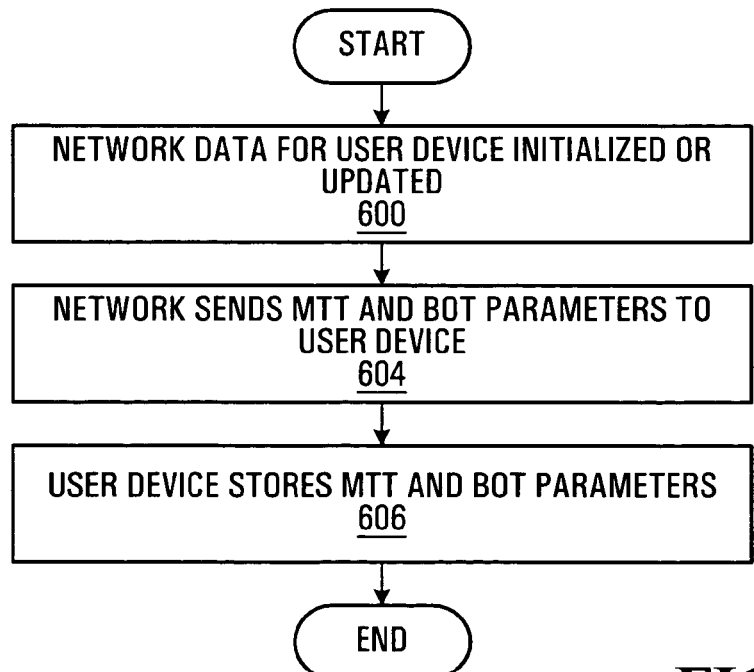
FIG. 6 is a flow diagram illustrating the steps performed in another embodiment of the invention for transmit channel policing parameter provisioning.

Referring to FIG. 6, a user device is provisioned with the MTT and BOT parameters whenever the network data for that user changes, or when the device is first initialized at step 600. Even if the user device is idle, the network sends MTT and BOT parameters to the user device in step 604.

These values are transmitted over a channel from the network to the user device. This can be transmitted on a separate control channel, or on a traffic channel. In an embodiment implemented in the iDEN™ system of Motorola™, a preferred logical control channel used to send the MTT and BOT is the data link layer sometimes referred to as layer 2. The MTT and BOT could be sent over the L2 control channel, such as the dedicated control channel (DCCH) or packet channel, or an associated control channel (ACCH). In step 606 the user device stores MTT and BOT parameters in the data store.

Numerous modifications and variations of the present invention are possible in light of the above teachings. It is therefore to be understood that within the scope of the appended claims, the invention may be practiced otherwise than as specifically described herein.

We claim:

1. A method for controlling a transmit channel of a push-to-talk wireless device, the method comprising: receiving parameters comprising:
   (a) a maximum talk time (MTT) that represents an amount of time the push-to-talk wireless device can continuously occupy the transmit channel; and
   (b) a back off time (BOT);
   being granted the transmit channel;
   after upon continuously occupying the transmit channel for the MTT, the push-to-talk wireless device automatically releasing the transmit channel thereby allowing another device to occupy the transmit channel;
   after automatically releasing the transmit channel, starting a BOT timer; and
   waiting until expiry of the BOT timer before transmitting a request for the transmit channel.

2. The method of claim 1, wherein the receiving is following a registration of the push-to-talk wireless device.

3. The method of claim 1, wherein the parameters are received from a network implemented using at least one of PoC, IDEN, 1xRTT CDMA, UMTS, GSM/GPRS and TDMA.

4. A push-to-talk wireless device comprising:
   a processing element configured to control a transmit channel of the push-to-talk wireless device by;
   receiving parameters comprising:
   (a) maximum talk time (MTT) that represents an amount of time the push-to-talk wireless device an automatically occupy the transmit channel; and
   (b) a back off time (BOT);
   being granted the transmit channel;
   upon continuously occupying the transmit channel for the MTT, the push-to-talk wireless device automatically releasing the transmit channel thereby allowing another device to occupy the transmit channel;
   after automatically releasing the transmit channel, starting a BOT timer; and
   waiting until expiry of the BOT timer before transmitting a request for the transmit channel.

5. The push-to-talk wireless device of claim 4, wherein the processing element is configured to receive the parameters following a registration of the push-to-talk wireless device.

6. The push-to-talk wireless device of claim 4, wherein the parameters are received from a network implemented using at least one of PoC, IDEN, IxRTT CDMA, UMTS, GSM/GPRS and TDMA.

7. A method for controlling a transmit channel of a push-to-talk wireless device, the method comprising: sending parameters comprising:
   (a) a maximum talk time (MTT) that represents an amount of time the push-to- talk wireless device can continuously occupy the transmit channel; and (b) a back off time (BOT) representing a minimum time after the release of the transmit channel before the push-to-talk wireless device can again request the transmit channel; and granting the transmit channel; wherein upon the transmit channel being continuously occupied for the MTT, the transmit channel is automatically released thereby allowing another device to occupy the transmit channel.

8. The method of claim 7, wherein the sending is following a registration of the push-to-talk wireless device.

9. The method of claim 7, wherein the parameters are sent by a network implemented using at least one of PoC, IDEN, I xRTT CDMA, UMTS, GSM/GPRS and TDMA.

10. An apparatus comprising:
    a talk control element configured to control a transmit channel of a push-to-talk wireless device by:
    sending parameters comprising:
    (a) a maximum talk time (MIT) that represents an amount of time the push-to-talk wireless device can continuously occupy the transmit channel; and
    (b) a back offtime (BOT) representing a minimum time after the release of the transmit channel before the push-to-talk wireless device can again request the transmit channel; and
    granting the transmit channel;
    wherein upon the transmit channel being continuously occupied for the MIT, the transmit channel is automatically released thereby allowing another device to occupy the transmit channel.

11. The apparatus of claim 10, wherein the talk control element is configured to send the parameters following a registration of the push-to-talk wireless device.

12. The apparatus of claim 10, wherein the talk control element is part of a network implemented using at least one of PoC, IDEN, I xRTT CDMA, UMTS, GSM/GPRS and TDMA.

13. The apparatus of claim 10, wherein the talk control element is external to a network implemented using at least one of PoC, IDEN, IxRTT CDMA, UMTS, GSM/GPRS and TDMA.

* * * * *

UNITED STATES PATENT AND TRADEMARK OFFICE
CERTIFICATE OF CORRECTION

| | |
|---|---|
| PATENT NO. | : 7,792,542 B2 |
| APPLICATION NO. | : 10/892202 |
| DATED | : September 7, 2010 |
| INVENTOR(S) | : Janus Sing Yau et al. |

It is certified that error appears in the above-identified patent and that said Letters Patent is hereby corrected as shown below:

Column 9; claim 1, line 36: "...comprising: receiving..." should read -- comprising: ¶ receiving --;

Column 9; claim 1, line 43: "after upon continuously..." should read -- upon continuously --;

Column 9; claim 4, line 59: "...device by;..." should read -- device by: --;

Column 9; claim 4, line 61: "(a)maximum..." should read -- (a) a maximum --;

Column 9; claim 4, line 62: "...device an automatically" should read -- device can continuously --;

Column 10; claim 6, line 15: "...IDEN, IxRTT CDMA..." should read -- IDEN, 1xRTT CDMA --;

Column 10; claim 7, line 18: "...comprising: sending..." should read -- comprising: ¶ sending --;

Column 10; claim 7, line 21: "...push-to- talk..." should read -- push-to-talk --;

Column 10; claim 7, line 22: "...channel; and (b)..." should read -- channel; and ¶ (b) --;

Column 10; claim 7, line 26: "and granting the transmit channel; wherein..." should read -- and ¶ granting the transmit channel; ¶wherein --;

Column 10; claim 9, line 35: "I xRTT CDMA,..." should read -- 1xRTT CDMA --;

Column 10; claim 10, line 40: "...talk time (MIT)..." should read -- talk time (MTT) --;

Column 10; claim 10, line 43: "...back offtime..." should read -- back off time --;

Column 10; claim 10, line 49: "...for the MIT,..." should read -- for the MTT, --;

Signed and Sealed this
Twenty-second Day of February, 2011

David J. Kappos
*Director of the United States Patent and Trademark Office*

CERTIFICATE OF CORRECTION (continued)
U.S. Pat. No. 7,792,542 B2

Column 10; claim 12, line 57: "...IDEN, I xRTT CDMA..." should read -- IDEN, 1xRTT CDMA --; and Column 10, claim 13, line 61: "...IDEN, IxRTT CDMA..." should read -- IDEN, 1xRTT CDMA --.